Figure 1:
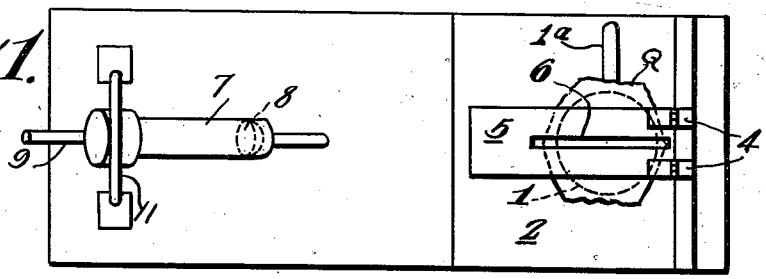

March 9, 1943.   P. D. GERBER   2,313,143
APPARATUS FOR EXAMINING QUARTZ
Original Filed May 31, 1939

Inventor
Paul D. Gerber
By
Attorney

Patented Mar. 9, 1943

2,313,143

UNITED STATES PATENT OFFICE 2,313,143

APPARATUS FOR EXAMINING QUARTZ

Paul D. Gerber, Woodlynne, N. J., assignor to Radio Corporation of America, a corporation of Delaware Original application May 31, 1939, Serial No. 276,666. Divided and this application July 31, 1940, Serial No. 348,908

7 Claims. (Cl. 88—14)

This invention relates to apparatus for examining quartz piezoelectric crystals. It is a division of application Serial No. 276,666, filed May 31, 1939, now U. S. Patent 2,218,489, issued October 15, 1940.

The above identified parent case discloses a method of determining (a) the location of an electrical or X-axis, (b) the location of the positive and negative terminals of the said X-axis, and (c) whether the quartz is of the "right-handed" or "left-handed" variety. The present case is concerned particularly with an apparatus for practicing the said method.

Perfect quartz crystals, or "rock crystals" as they are sometimes called, occur in nature in the form of hexagonal bipyramids. Where any of the side or apex faces of the mother crystal remain intact, the location of an X-axis is a very simple matter since any line drawn parallel to that face in a plane normal to the Z axis coincides with an X-axis.

In the case of so-called "river bed quartz," where the action of water over very long periods of time has worn away all of the natural faces of the quartz, and in the case of mere fragments of quartz, the location of the X-axes has heretofore been a most complicated procedure requiring the use of X-rays or other special electrical equipment.

Accordingly, the principal object of the invention is to provide an extremely simple and accurate apparatus for determining the location of an X-axis in "river bed" and other imperfect quartz bodies.

In the production of X-cut (Curie cut) and Y-cut (Tillyer cut) crystal elements wherein the thickness dimension of the finished element is parallel to one or the other of the said axes, and its electrode faces are parallel to the optical (Z) axis, it is a matter of no moment to the person cutting the element whether the mother crystal is of the left-handed or right-handed variety, and he may be entirely oblivious as to which is the positive and which is the negative end of the axis which he has selected as a reference axis. However, in the case of more recently developed crystal cuts wherein the electrode faces of the element are tilted with respect to the optical (Z) axis, it is important (in the absence of a side or of an apex face which may be used as a reference plane) that the person cutting the mother crystal know whether the quartz upon which he is working is of the right-handed or left-handed variety, since the sense of direction of the angle of tilt required to achieve a desired characteristic (say, a "low temperature coefficient of frequency") may be, and usually is, different in the two types of quartz.

Accordingly, another and important object of the invention is to provide an apparatus for locating an X-axis in a quartz crystal and one which in its operation likewise discloses the electrical sense or polarity of the said axis and also the type of quartz under inspection.

Figure 2:
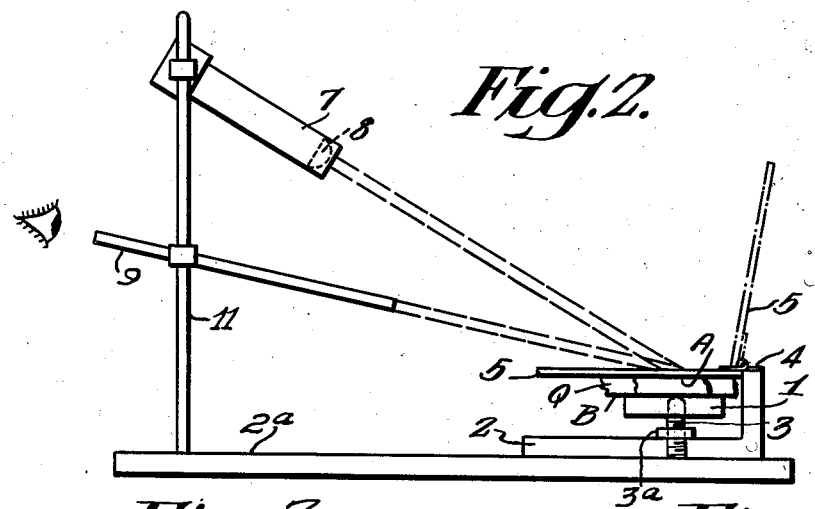
Figure 3:
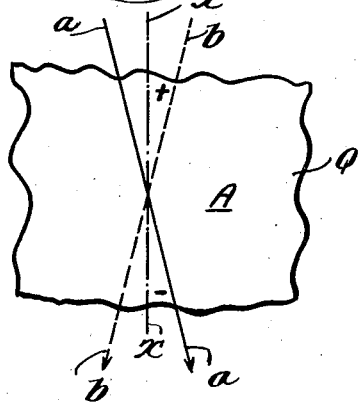
Figure 4:
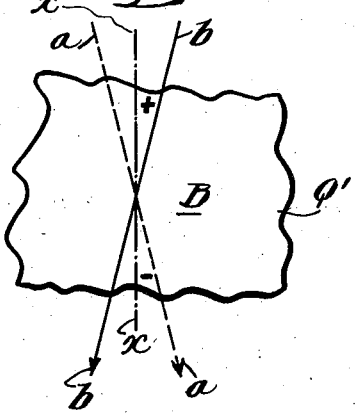

Other objects and advantages will be apparent and the invention itself will be best understood by reference to the following specification and to the accompanying drawing wherein Figure 1 is a top plan view and Figure 2 is a side elevational view of an apparatus within the invention, and Figures 3 and 4 are plan views of quartz slabs whose faces lie in planes normal to the optic axis, and wherein the said faces have been inspected and marked with reference characters and lines as an aid in explaining the principle of the invention.

Before using the apparatus of Figs. 1 and 2, it is first necessary to determine the location of the optical or Z-axis in the mother crystal. This may be accomplished by any of the known methods or means. By way of example, the mother crystal, if it is transparent or, alternatively, a transparent piece cut from any part of the mother crystal, may be immersed in cedar oil or equivalent substance and examined by means of polarized light while rotating the specimen until the colored light patterns or rings which are characteristic of the Z-axis are observed. The Z-axis at that time lies along the line of sight of the observer. The location of the Z-axis having been determined, a slab of any desired thickness is cut from the mother crystal in such a manner that the major faces of the slab lie in parallel planes which are substantially normal to the Z-axis.

This slab is then etched as by immersing it overnight in a bath of hydrofluoric acid. When a 48 per cent concentration of hydrofluoric acid is employed, an etching time of from, say, ten to, say, sixteen hours is recommended. Irrespective of the exact duration of the etching time, it is desirable that both faces of the slab be equally subject to the action of the acid. Accordingly, the slab is preferably mounted on its edge in the bath so that both of its said faces are freely exposed to the acid. After being removed from its acid bath, rinsed and dried, the slab is ready for inspection.

Referring now to Figs. 1 and 2, which show a preferred form of apparatus which may be employed in the inspection and marking of the blank. In these figures, 1 designates a turntable upon which the quartz crystal slab Q is laid or clamped with one of its etched plane faces A exposed. This turntable 1, which may be provided with a handle 1a, is preferably arranged to accommodate slabs of various sizes and thicknesses. To this end, it is mounted for movement on a slidable base 2 which is supported on a sub-base 2a. The turntable 1 is adjustable in the vertical direction as by means of screw 3 having a suitable lock nut 3a. An upright bracket 4 on the base 2 supports a ruler which may conveniently be in the form of a hinged plate 5 having a slot 6 therein for guiding a pencil or stylus (not shown) over the exposed face of the crystal Q when the plate 5 is brought adjacent thereto.

A projector 7 containing a lamp (not shown) and a collimating lens 8 is directed towards the crystal Q so that the parallel rays of light impinge upon the exposed face A of the slab at an angle of substantially 30°. A paralleloscope or collimator 9, which may consist simply of a ½-inch tube 15 to 20 inches long and having its inner surface blackened, is provided for picking up light reflected in the return direction from the crystal. This collimator 9 is directed towards the upper face of the crystal at an angle of substantially 10° to 15°. The projector 7 and the collimator 9 are preferably adjustably supported upon a common supporting rod 11 and must, in any event, extend in the same relative direction towards the crystal. The projector, the collimator and the eye of the observer must, for optimum accuracy, all reside in the same vertical plane, i. e., the plane containing the parallel rays of light which leave the collimating lens 8 and are reflected back into the collimator 9.

As a result of the etching process, the surfaces (A and B) of the quartz which are normal to the optical or Z-axis reveal innumerable triangular crystalline pyramids of microscopic size. The planes of these crystalline particles are so arranged that only when the electrically negative (—) end of an X-axis is pointed in the general direction of the source of light will the collimator pick up a sharply defined reflection of the light. Accordingly, the turntable 1 is rotated until such reflection is obtained, the final adjustment of the turntable being such that the reflected rays as viewed through the collimator 9 are of maximum intensity. The hinged plate or ruler 5 is then brought adjacent the upper face A of the quartz slab Q and this reflection line or axis a—a, Figs. 3 and 4, is preferably marked thereon as by inserting the point of the pencil or stylus in the straight slot 6 and drawing it therealong.

The reflection-axis a—a now marked on one (A) of the two (A—B) parallel faces of the slab Q does not coincide with an X-axis but usually forms an angle of about 13° with an X-axis. This angle will vary from about 10° to 16° with the depth of the etching, and possibly with other factors, such, for example, as the quality of the quartz and with minor inaccuracies in the orientation of the opposite faces A and B of the slab. This variation, however, is of substantially no moment as far as the practice of this invention is concerned.

In order to determine the substantially exact location of an X-axis, the slab is turned over so that the corresponding area of its opposite face (B) is now presented to the parallel rays of light from the projector 7, and the same steps of inspecting and marking the crystal are repeated. The reflection line noted in the inspection of the said opposite face (B) of the slab Q is shown by the broken line b—b in Fig. 3 and by the similarly designated solid line in Fig. 4. This second reflection line b—b, like the one a—a on the opposite face (A) of the slab Q, does not coincide with an X-axis but, provided both faces have been equally exposed in the etching process and are otherwise similar, will be removed the same number of degrees in the opposite direction from the X-axis. Thus, as the final step in locating the X-axis, it is merely necessary to bisect the opposite acute angles formed by the intersection of the reflection axes a—a, b—b. In both Figs. 3 and 4, the now located X-axis is designated by the dot-and-dash line X—X.

Since, as is well known to those skilled in the art, a crystal face which lies in a plane normal to the Z-axis exhibits three-fold symmetry, it follows that the other two X-axes of the crystal may be located, if desired, by lines (not shown) which intersect the line X—X at angles of 120° in the same plane.

As previously set forth, it is only when the electrically negative (—) end of an X-axis is pointed in the general direction of the source of light that the collimator 9 will pick up a sharply defined reflection of the light. Accordingly, when the polarity of the X-axis is of interest, one or both of the surfaces A, B of the slab Q may be marked adjacent the opposite terminals of the X-axis with suitable indicia, say, the symbols — and +.

In order to determine the type of quartz (i. e., whether it is "right-handed" or "left-handed" quartz), it is merely necessary to determine the direction in which the bisector or X-axis, X—X, need be rotated to coincide with the adjacent reflection axis a—a, or b—b. Thus, referring to Fig. 3, wherein the plane A, which is marked with the reflection axis a—a, faces the observer, it will be noted that if the X-axis is to be rotated the shortest distance necessary to cause it to coincide with the said reflection axis a—a, it will have to be rotated in a counter-clockwise direction. This is an infallible indication that the quartz specimen is of the "left-handed" variety. Conversely, as indicated in Fig. 4, if the X-axis must be rotated in a clockwise direction to cause it to coincide with the adjacent reflection axis b—b, the quartz is of the right-handed variety.

The location of the Z and X-axes, the polarity of the X-axis, and the type of quartz all having been determined, the technician may proceed to cut a crystal element from either of the left-handed and right-hand slabs Q—Q', respectively, having any desired orientation with respect to these axes in the same manner that he would if these slabs had been cut from a perfect mother crystal.

Throughout this specification, the terms "right-handed" and "left-handed", as employed in designating the different varieties of quartz, are used in the sense now almost universally accepted in the art of piezoelectricity. That is to say, the Herschel convention is employed. In agreement with this convention, a quartz crystal is designated as "right-handed" if it rotates the plane of polarization of plane polarized light traveling along the optical or Z-axis in a right-hand or clockwise direction, as viewed by an observer looking into the crystal from a point adjacent the source of light, and is designated "left-handed" if it rotates the plane of polarization to the left or in the counter-clockwise direction, as viewed from the same point.

Also, the terms "positive" and "negative" as employed in designating the polarity of the opposite terminals of the X-axis are used in their ordinary and generally accepted electrical sense.

Various modifications of the invention will suggest themselves to those skilled in the art. Accordingly, the foregoing is to be interpreted as illustrative and not in a limiting sense except as required by the spirit of the appended claims

What is claimed is:

1. Apparatus for inspecting crystals comprising a base, a turntable for a crystal specimen mounted on said base, a projector including a collimating lens supported above said base and offset from said turntable, and a paralleloscope mounted on the same offset side of said turntable as said projector for observing the light from said projector which is reflected from said specimen.

2. The invention as set forth in claim 1 and wherein said turntable is mounted for vertical and horizontal movement on said base.

3. The invention as set forth in claim 1 and wherein said projector is adjustably mounted at an angle of substantially 30° with respect to the reflecting surface of said specimen.

4. The invention as set forth in claim 1 and wherein said paralleloscope is adjustably mounted at an angle of substantially 10° to 15° with respect to the reflecting surface of said specimen.

5. Apparatus for inspecting crystals comprising a base, a turntable for a crystal specimen mounted on said base, a projector including a collimating lens adjustably supported above said base and offset from said turntable, a paralleloscope adjustably mounted on the same offset side of said turntable as said projector for observing the light from said projector which is reflected from said specimen, a support on said base and a ruler adjustably mounted on said support above said turntable and movable into position adjacent said specimen as a guide for marking said specimen along its line of maximum reflection.

6. An inspection apparatus including a base, a specimen support mounted for rotatable movement on said base, a projector including a collimating lens adjustably supported above said base and offset from said support, a paralleloscope adjustably mounted on the same offset side of said support as said projector for observing the light from said projector which is reflected from said specimen, a fixed support on said base diagonally opposite said projector and paralleloscope, and a ruler hingedly mounted on said fixed support and movable into position adjacent said specimen as a guide for marking said specimen along its line of maximum reflection.

7. An inspection apparatus including a base, a rotatable specimen support mounted on said base, a projector including a collimating lens supported above said base and offset from said specimen support, and a paralleloscope mounted on the same offset side of said specimen support as said projector for observing the light reflected from said specimen.

PAUL D. GERBER.